Dec. 22, 1964    R. J. PEGIS    3,162,711
MOIRE FRINGE CONSTRUCTIONS INCLUDING A
REPEATING IRREGULAR PATTERN
Filed May 5, 1961    2 Sheets-Sheet 1

*INVENTOR.*
RICHARD J. PEGIS
BY
ATTORNEYS

Dec. 22, 1964  R. J. PEGIS  3,162,711
MOIRE FRINGE CONSTRUCTIONS INCLUDING A
REPEATING IRREGULAR PATTERN
Filed May 5, 1961  2 Sheets-Sheet 2

*INVENTOR.*
RICHARD J. PEGIS
BY
ATTORNEYS

United States Patent Office 3,162,711
Patented Dec. 22, 1964

3,162,711
MOIRE FRINGE CONSTRUCTIONS INCLUDING A REPEATING IRREGULAR PATTERN
Richard J. Pegis, Hilton, N.Y., assignor to Bausch & Lomb Incorporated, Rochester, N.Y., a corporation of New York
Filed May 5, 1961, Ser. No. 108,162
6 Claims. (Cl. 88—1)

This invention relates to novel grid constructions for use in moire fringe devices, and more particularly to novel grid constructions in which the grid lines and the intervals between them are arranged to produce moire fringes of improved definition and resolution relative to previous moire fringes.

Moire fringe effects are well known and have been previously proposed for use particularly in measuring devices. See, for example, U.S. Patents No. 1,415,627 issued to G. E. Giambiasi, May 9, 1922, and Nos. 2,390,122 and 2,451,972 issued to W. P. Powers, December 4, 1945, and October 19, 1948 respectively. Previously known moire fringe devices have been subject to certain limitations in use and have not found wide acceptance. With the current advent of relatively high precision measurement techniques, moire fringe devices appear to warrant further development and investigation.

One problem in previous moire fringe devices relates to the relatively poor resolution characteristics of moire fringes produced by them. The light density, or transmission in previous devices varies linearly from a maximum to a minimum, with the result that the center of a fringe is relatively difficult to ascertain, and position readings cannot be made with assured accuracy.

Accordingly, one important object of the present invention is to provide novel moire fringe grid constructions capable of producing relatively narrow, sharply defined, and relatively widely spaced moire fringes.

The foregoing and other objects and advantages of the invention will become apparent in the following detailed description of representative embodiments thereof, taken in conjunction with the drawings, wherein.

Briefly, the present invention contemplates novel grid constructions for producing moire fringes in which each pitch of the grid is divided not into two portions of equal widths, one dark and the other clear, but into several portions according to specified principles, alternate ones being dark and clear, respectively, and being of different respective widths according to a non-repetitive and irregular function. Preferably, the total width of all the clear spaces, or intervals is equal to one-half the pitch so that fifty percent illumination is provided when two identical such grids are in superimposed register with each other. It is also preferable that the two portions of the pitch be negative copies, or contrast reversals of each other so that when the two grids are offset by a half pitch, the light transmission is substantially completely obscured.

The grid constructions according to the invention, when used in the so-called crossed grid arrangement, that is, with two grids superimposed in parallel planes with their lines at a relatively small inclination to each other, provide relatively narrow fringes, relatively widely spaced apart, with good contrast characteristics. The exact characteristics of the fringes, including variations in light transmission in the intervals between the fringes may be chosen as desired according to the specific design requirements in each case.

Figure 1:
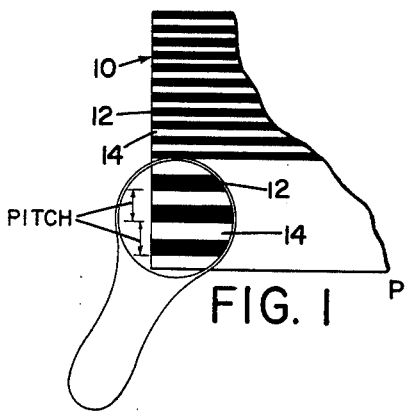
FIG. 1 is an elevational, fragmentary view of a moire fringe grid construction according to the prior art.

FIG. 1 shows a prior art grid 10 on an enlarged scale, and illustrates the use of the word pitch herein to denote the extent of a single repeat in the grid pattern. In the prior art case this includes the width of one line 12 plus the width of its adjoining interval 14. The grid 10 is the customary grid as used in prior art moire fringe devices, and includes lines 12 and intervals 14 of substantially equal width, which arrangement provides fringes of maximum contrast. It is recognized that previous grid constructions for producing moire fringes have been proposed in which the line widths are different from the interval widths, but such constructions suffer the disadvantage of relatively poor fringe contrast.

Figure 2:
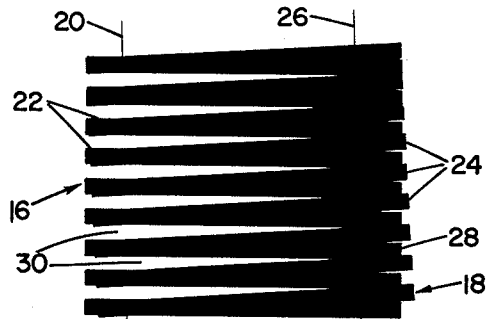
FIG. 2 is an elevational view, on an enlarged scale of a pair of superimposed grids according to the prior art illustrating the principles of fringe formation.

FIG. 2 illustrates a typical prior art crossed grid arrangement including two grids 16 and 18 similar to the grid 10 shown in FIG. 1 with their lines inclined relative to each other, the angle shown being exaggerated relative to the inclination ordinarily contemplated for commercial practice. The figure is presented for the purpose of demonstrating the theory of moire fringes, to show clearly how two line grids cooperate to produce moire fringes, and to assist in explaining the diagrams and charts shown on FIGS. 4–7. Along the reference line 20, there is a maximum of light transmission, because along this line 20 the grid lines 22 and 24 are directly superimposed upon each other leaving maximum clearance between them for illumination. The second reference line noted in the figure is the line 26, which delineates the center of one of the fringes produced by the crossed grids 16 and 18. Along this line there is substantially no light transmission, because it is drawn through that portion of the grid pattern where the lines 24 of the one grid 16 are directly superimposed over and completely fill the intervals 28 of the other grid 18.

The clear spaces 30 between the superimposed lines 22 and 24 are triangular in form, and taper linearly from the reference line 20 of the maximum light transmission to the reference line 26 of minimum transmission. Because of this gradual change in illumination, it is often relatively difficult to discern the location of the center of the fringe with assured accuracy. A chart similar to the charts set forth below with respect to the moire fringe grid constructions according to the invention may be constructed for the prior art grid arrangement by plotting the total light transmission at successive positions between the two reference lines 20 and 26. Such a construction would show how that the light transmission has a linear, triangular characteristic as indicated by the dashed line 32 in the chart shown in FIG. 4.

In prior art grids, the pitch is constituted by one dark line and its adjacent interval. The grid constructions according to the present invention are relatively more complex, and include more than one line and interval in each pitch, or repeat. According to the preferred embodiment of the invention, each pitch of the grid includes two juxtaposed portions which are negative copies, or contrast reversals of each other, and each portion includes plural dark lines and clear intervals of various different widths. The line-interval pattern in each half-pitch is preferably irregular and non-repetitive.

The result is that when two similar such grids are superimposed with their lines parallel to each other, there is one position where they are in register and the light transmission is 50%, and a second position where they are out of register by one-half pitch and the light transmission is substantially completely obscured. This insures the same degree of fringe contrast as in the prior art grid construction illustrated in FIGS. 1 and 2. However, in the grid constructions according to the present invention, the light transmission does not vary linearly between the positions of in-register and half-pitch out of register as it does in the prior art constructions, but varies according to a different function depending upon the particular pattern of the grids.

In this connection it may be well to explain here that the effect of plotting the light transmission values at successive positions across a pair of crossed grids as described hereinabove in connection with FIG. 2 produces the same result as would be produced by superimposing the two grids with their lines parallel and plotting the total light transmission through them as a function of their relative movement in the direction transverse to the lines. When the two grids 16 and 18 shown in FIG. 2, for example, are exactly in register with each other with their lines parallel, the light transmission is at a maximum, as it is along the reference line 20, and when they are one-half pitch out of register, the light transmission is substantially completely obscured, as along the reference line 26. Moreover, the variation in light transmission as a function of the relative movement of the two grids 16 and 18 would be linear between these two index points, as indicated by the dashed line 32 in FIG. 4.

It can thus be seen that the variations of illumination intensity in the moire fringe patterns produced by any given pair of grids arranged in the so-called crossed grid relationship is generally similar to the time sequence variation in illumination provided by the same pair of grids arranged in parallel relationship and moved relative to one another. The schematic charts and diagrams shown in FIGS. 4–7 are based upon this principle, the diagrams being used as a basis for constructing the curves shown in the charts.

Figure 4:
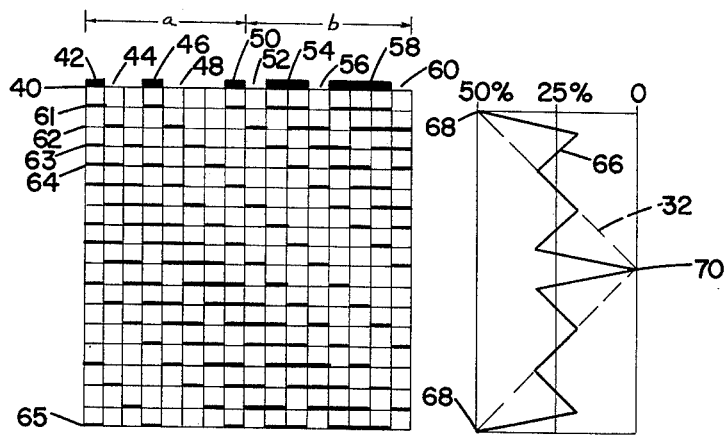
FIG. 4 is a schematic diagram and chart illustrating the fringe characteristics of fringes produced by a pair of grids similar to the grid shown in FIG. 3.

A grid construction according to one embodiment of the invention is shown schematically on the diagram of FIG. 4. This line 40 represents a cross-sectional view of one pitch, or repeat of the grid, the dark lines being represented by the black areas and the intervals being left clear. The first half $a$ of the repeat includes a first line 42 of unit width followed by an interval 44 of two units width, a second line 46 of unit width, a second interval 48 of three units width, and a third line 50 of unit width. The second half $b$ of the repeat is a negative copy of the first half $a$, and includes a first interval 52 of unit width, followed by a line 54 of two units width, a second interval 56 of unit width, a second line 58 of three units width, and finally, an interval 60 of unit width.

The profile of the illumination intensity pattern of fringes produced by a pair of such grids arranged with their lines at a predetermined inclination relative to each other may be determined according to the construction indicated by the successive lines 61, 62, 63, 64, and 65 indicated below the line 40. The lines 61, 62, 63, 64, and 65 may be thought of as representing a second grid identical to the first grid shown on the line 40, in successive positions as it advances in steps of unit length from a position in register with the first grid through a distance equal to one repeat. The total light transmission through the two grids, that is, the one on the line 40 and the one shown on the successive lines beneath the line 40 may then be readily computed for each step of the advance of the lower grid, and plotted on the chart 66 to produce a graph showing the variations in light intensity across the fringe pattern produced by the two grids.

It will be seen that when the grids are in exact registration with each other, the transmission is 50% as indicated by the point 68 of the curve, and when the grids are one-half pitch out of register, as indicated by the point 70 the transmission is substantially completely obscured. The variation in transmission between these two points is not a simple, straight line function as in the case of the previous, regular grid patterns, but is an irregular function, showing no well-defined fringes and having an average transmission of about 25%. The point 70 of minimum transmission is well and sharply defined, with the light transmission increasing to a value of about 33% within one unit on each side of the center point 70.

Figure 3:
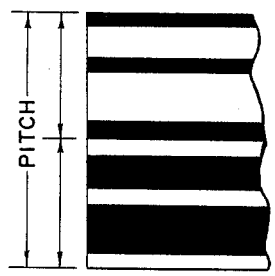
FIG. 3 is a fragmentary greatly enlarged view of a grid construction according to a first embodiment of the invention.

FIG. 3 is a fragmentary, plan view of the grid construction illustrated in FIG. 4.

Figure 5:
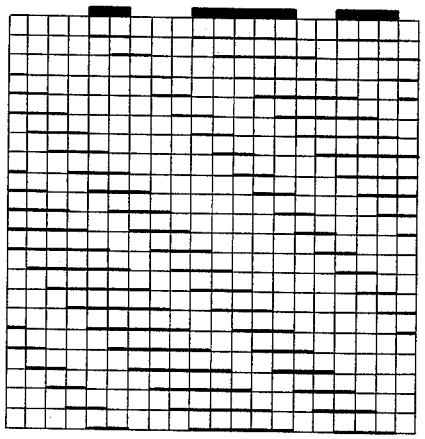
FIG. 5 is a schematic diagram and chart illustrating the characteristics of fringes produced by a pair of grids according to a second embodiment of the invention.
Figure 5:
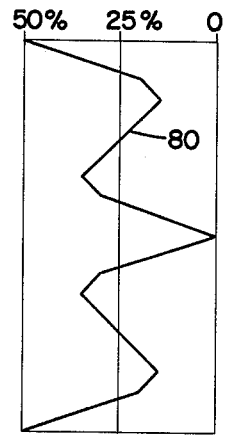
Figure 6:
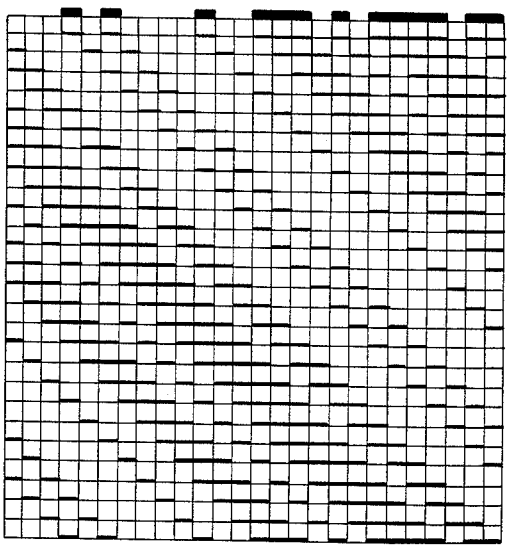
FIG. 6 is a schematic diagram and chart illustrating the characteristics of fringes produced by a pair of grids according to a third embodiment of the invention.
Figure 6:
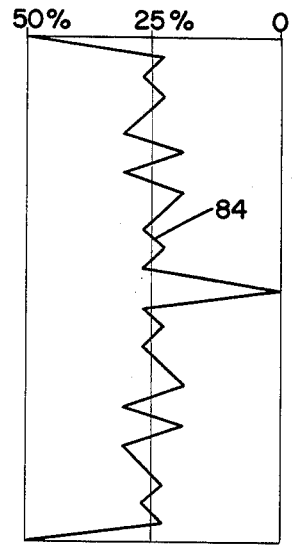
Figure 7:
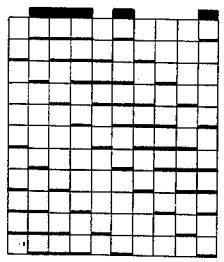
FIG. 7 is a schematic diagram and chart illustrating the characteristics of fringes produced by a pair of grids according to a fourth embodiment of the invention.
Figure 7:
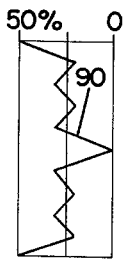

Similarly constructed diagrams and charts are illustrated for various different arbitrarily chosen grid arrangements according to the invention in FIGS. 5, 6, and 7. In each case, the pitch of the grids is arranged in two parts, each part being a negative copy, or contrast reversal of the other part, and the line and interval widths of each part are chosen according to a non-repetitive pattern.

Figure 8:
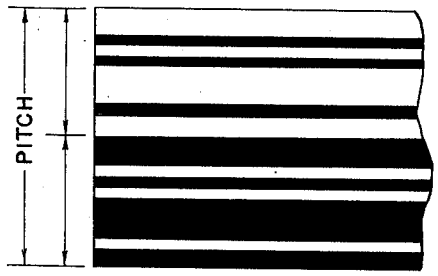
FIG. 8 is a fragmentary, elevational view of a grid according to the invention, generally corresponding to the diagram and chart shown in FIG. 6.

A pair of grids according to the ten unit construction illustrated in FIG. 5, each half of the repeat being based on a width of ten incremental units produces a fringe pattern having a light transmission characteristic according to the curve 80 shown on the chart. The 13 unit construction illustrated in FIG. 6 produces a curve similar to the curve 84 shown therein, and the relatively simple 5 unit construction illustrated in FIG. 7 produces a pattern 90 in which the fringe is less sharply defined than in the more complex 13 unit construction illustrated in FIG. 6. A fragmentary, plan view of one repeat of a construction corresponding to the 13 unit construction shown schematically in FIG. 6 is shown in FIG. 8.

What is claimed is:

1. A moire fringe device comprising a pair of superimposed line grids each having parallel variable width dark lines and clear intervals, and means supporting said grids in superimposed predetermined orientation with their respective grid lines at a relatively small inclination to each other and movable relative to each other in a direction substantially normal to the grid lines of one of the line grids, each of said grids including a repeating irregular pattern of the lines and the intervals.

2. A moire fringe device comprising a pair of superimposed line grids each having parallel variable width dark lines and clear intervals, and means supporting said grids in superimposed predetermined orientation with their respective grid lines at a relatively small inclination to each other and movable relative to each other in a direction substantially normal to the grid lines of one of the line grids, each of said grids including a repeating irregular pattern of the lines and intervals, and the total area of said lines being approximately equal to the total area of said intervals.

3. A moire fringe device comprising a pair of superimposed line grids each having parallel variable width dark lines and clear intervals, and means supporting said grids in superimposed predetermined orientation with their respective grid lines at a relatively small inclination to each other and movable relative to each other in a direction substantially normal to the grid lines of one of the line grids, each of said grids including a repeating irregular pattern of the lines and intervals and one of said grids being a translational transformation of the other of said grids of ½ pitch in a direction orthogonal to the grid line direction so that when said two grids are in predetermined register with one another the lines and intervals of each grid cover respectively the intervals and lines of the other grid.

4. A moire fringe device comprising a pair of superimposed line grids having parallel dark lines and clear intervals, and means supporting said grids in superimposed predetermined orientation with their respective grid lines at a relatively small inclination to each other and movable relative to each other in a direction substantially normal to the grid lines of one of the line grids, selected lines of each grid being of different width from other selected lines thereof, the variation in line width of each grid being according to an irregular repetitive pattern.

5. A moire fringe device comprising a pair of superimposed line grids having parallel dark lines and clear intervals, and means supporting said grids in superimposed predetermined orientation with their respective grid lines at a relatively small inclination to each other and movable relative to each other in a direction substantially normal to the grid lines of one of the line grids, selected lines of each grid being of different width from other selected lines thereof, the variation in line width of each grid being according to an irregular repetitive pattern, each repeat consisting of two portions one of which is a negative copy of the other.

6. A moire fringe device comprising a pair of line grids having parallel dark lines and clear intervals, and means for supporting said grids in predetermined orientation and movable relative to each other, selected lines of each grid being of different width from other selected lines thereof, the variation in line width of each grid being according to an irregular repetitive pattern, each repeat consisting of two portions one of which is a negative copy of the other, the width of said lines and intervals being the same on both of said grids whereby when said grids are superimposed in one position there is maximum light transmission through them and when they are moved from said one position a distance equal to one-half of one repeat in the direction of the repeat light transmission through them is substantially completely occluded.

References Cited in the file of this patent
UNITED STATES PATENTS

| | | |
|---|---|---|
| 2,016,036 | Fitz Gerald | Oct. 1, 1935 |
| 2,179,000 | Tea | Nov. 7, 1939 |
| 2,886,717 | Williamson et al. | May 12, 1959 |
| 2,993,279 | Bower | July 25, 1961 |